Fig. 1

March 13, 1956    W. O. ELSON    2,738,059
PACKAGED SURGICAL SUTURES AND METHOD OF PREPARING SAME
Filed April 24, 1952    5 Sheets-Sheet 2

INVENTOR.
William O. Elson
Rowland V. Patrick
BY
ATTORNEY

INVENTOR.
William O. Elson
BY Rowland V. Patrick
ATTORNEY

United States Patent Office 2,738,059
Patented Mar. 13, 1956

2,738,059
PACKAGED SURGICAL SUTURES AND METHOD OF PREPARING SAME

William O. Elson, Wheaton, Ill., assignor to The Kendall Company, Boston, Mass., a corporation of Massachusetts Application April 24, 1952, Serial No. 284,174

11 Claims. (Cl. 206—63.3)

This invention relates to proteinaceous sutures generally referred to as catgut sutures and more particularly to the preparation of such sutures for surgical use.

Sale of surgical catgut in the United States is subject to the rigid specifications set up by the U. S. Pharmacopoeia and enforced by Government agencies. These specifications include, besides imperative sterility, standards of straight pull strength, knot strength and gauge.

Present day commercial methods of catgut preparation for surgical use universally involve heat-sterilization. Heat-sterilization techniques can be successfully carried out to produce surgical sutures conforming with the U. S. Pharmacopoeia strength requirements, provided the heat-sterilization takes place in the absence of all but minute quantities of water. The minimum amount of water permissible at the time of heat-sterilization is insufficient, however, to give the suture that plasticity and flexibility which the surgeon regards as essential for his easy manipulation and knot tying. Hence, additional water must be added before use.

Since the surgeon prefers that the suture be flexible when it is removed from the tube, most sutures are now merchandised in so-called "non-boilable" form, that is, in a form wherein the suture contains a greater moisture content than that which is permissible during heat-sterilization. In order to merchandise the suture in this form, it is necessary to add the water after the heat-sterilization.

A typical method of manufacture is, therefore, to heat-sterilize the suture in substantially dry form in an unsealed tube after suitable mechanical preparation, such as polishing, abrading, etc. Thereafter, a tubing fluid containing such amount of water as is necessary to plasticize the suture is added by aseptic technique. The tube containing the suture and fluid is then sealed. Prior to use, one need merely cleanse the outside of the tube by immersing the tube in a germicidal solution and then break the tube, and remove and straighten the suture.

Raw unsterilized catgut has repeatedly been shown to be highly resistant to enzyme digestion and, hence, it is generally recognized that in animal tissue it would have a very slow rate of absorption if indeed it can be considered as being absorbable at all.

One of the incidents of heat-sterilization is a large decrease in the resistance of the catgut to absorption in living tissue. Such a decrease is sometimes decidedly disadvantageous, for, in many instances of surgical use, substantial catgut resistance to digestion may be desirable. I know of no practical way of avoiding substantial drop in absorption resistance of heat-sterilized catgut.

In fact, the resistance of heat-sterilized plain catgut to absorption is so low that manufacturers have resorted to a tanning treatment producing what is now generally known as chromic catgut. By such tanning treatment, a heat-sterilized chromic gut may be prepared which has a slower rate of absorption in living tissue than that of a plain heat-sterilized metal-free or untanned catgut. However, again, the rate of absorption of a sterilized chromic catgut is much greater than its rate of absorption would be if it had not been subjected to the heat of sterilization.

Moreover, there is no way of controlling the absorption characteristics of a plain catgut over a wide range of acceptable absorption.

Hence, in the case of either plain or chromic catgut, application of the heat of sterilization has two drawbacks; first, it lowers resistance to absorption by an unavoidable substantial amount so great that practically usable heat-sterilized plain or chromic catgut which is substantially non-absorbable, or of only slow absorbability, cannot be prepared; and, second, the loss of resistance cannot be varied for any individual suture, chromic or plain, over any very wide range of acceptable absorption.

This invention provides, for the first time, a method for controlling the absorption characteristics of plain or chromic catgut over a wide range of acceptable absorption while still preparing a sterile suture. The control is so precise that I may produce a sterile catgut that has any desired rate of absorption in living tissue all the way from a very fast rate, equal to or faster than that of present day plain heat-sterilized catgut, up to rates that are so slow that the suture, in effect, becomes a substantially non-absorbable suture, i. e., one which has as much resistance to absorption as it had prior to sterilization.

By reason of the method of this invention, I can preserve in the finished product of my invention, any desired portion of the original non-absorption characteristics of the raw material and I need not sacrifice, in the sterilization technique, resistance to absorption—one of the very valuable properties of the raw material which manufacturers have never been able to provide for surgeons in the finished sterilized product. Such relatively non-absorbable U. S. P. sterile catgut sutures are wholly new.

In addition, losses in breaking strength during sterilization of my products are much less than those caused by heat-sterilization.

I have found that in a reaction product of catgut with ethylene oxide in very small proportions, as hereinafter described, the absorption characteristics in living animal tissue may be varied over a wide range from almost non-absorption to fast absorption in more or less direct proportion to the ratio of ethylene oxide to the catgut, provided that the catgut is not subjected in processing to any heat above 70° C.

My investigations show that the amount of ethylene oxide necessary to secure sterility is very minute when the catgut is stored in a hermetically sealed package in any conventional tubing fluid to which the ethylene oxide has been added.

I have further discovered that the presence of ethylene oxide in such a package in excess of about 3% by volume of the tubing fluid will, over a period of storage, have such a reactive effect upon small size 60-inch lengths of catgut, for example No. 0, or smaller, that the catgut, upon removal from the package, will not meet U. S. P. strength requirements.

While it is possible to maintain U. S. P. strength requirements even after prolonged periods of storage with amounts of ethylene oxide up to 3% by volume of the tubing fluid, I have discovered that as much as 3% of ethylene oxide in all cases of U. S. P. gauge sutures, deprives the catgut of satisfactory absorption rates. Hence, in accordance with this invention, the proportion of ethylene oxide by volume of the tubing fluid is held within a critical range which has, as its minimum, the percentage of ethylene oxide required for sterility and, as a maximum, the percentage of ethylene oxide which does not increase the rate of absorption beyond practical surgical acceptability. Expressed in terms of volume tubing solution, this range is, for reasons hereinafter shown to be critical, from .01 to 2% by volume in the case of 3½ cc. of tubing fluid depending directly upon the weight of the catgut and the desired rate of absorption.

Marked additional advantages are gained by the use of ethylene oxide as the sterilizing agent. First, it may readily be added to the conventional tubing fluids; second, the packaging of the product may be carried out without aseptic techniques—sterility is achieved wholly by storage at room temperature in sealed tubes; and, third, water or other catgut softening agent in sufficient quantity to maintain the catgut flexible may be included at the time of sealing without causing any detrimental effect, such as occur, as previously outlined, if such quantities of water are present during heat-sterilization. A very easily packaged product with substantial manufacturing savings is thus provided. Danger of contamination during packaging is wholly eliminated because the packaging does not need to be done aseptically.

Objects of this invention thus include the preparation of hermetically sealed packages of U. S. P. standard plain catgut sutures which may have absorption characteristics in ranges of absorption resistance never heretofore available in packaged sterile catgut suture put-ups.

A further object of this invention is the provision of hermetically sealed packages of catgut sutures, plain or chromic, which sutures are rendered sterile automatically during storage in the sealed package and have absorption characteristics determined by a selected amount of ethylene oxide included in the package at the time of sealing, the suture conforming to U. S. P. standards upon removal after storage for the sterility period.

It is also an object of this invention to provide such packaged sutures, the flexibility of which sutures is predeterminedly controlled by the inclusion at the time of sealing and prior to sterilization, of selected amounts of a softening agent for catgut, inclusive of amounts of water exceeding the permissible heat-sterilization maximum.

Figure 1:
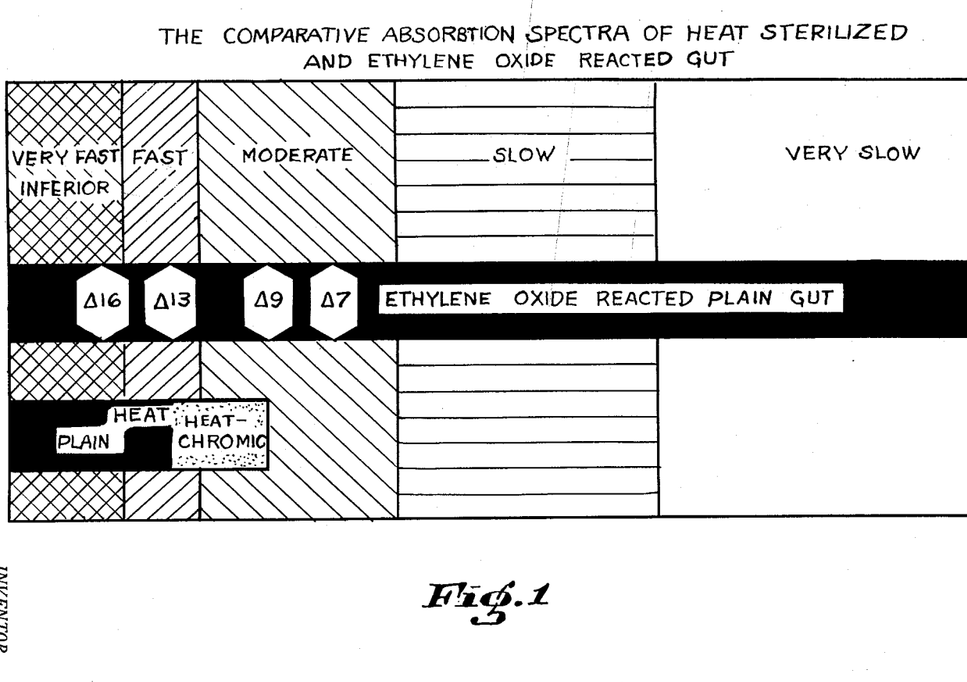
Figure 1 is a chart showing the comparative absorption spectra of heat sterilized and ethylene oxide reacted gut.

Figure 1 illustrates the range of absorption characteristics which I may attain by the practice of my invention, as compared with the highly limited range of absorption characteristics that are possessed by present-day commercial catgut sutures.

The right hand edge of the absorption spectra of Fig. 1 represents the absorption characteristics of a raw catgut, i. e., one with substantially non-absorbency in living tissue.

The diagram includes zones from left to right representing a zone of very fast absorbability, which is decidedly inferior and not acceptable from the surgeon's standpoint, through fast, moderate, slow and very slow zones.

In the lower portion of the diagram the absorption areas which can be achieved by a plain heat-sterilized gut, are confined to the very fast zone and the faster portion of the fast zone, because heat-sterilization drops the absorption resistance of the gut by such a large amount.

As further shown in the chart of Fig. 1, the absorption rates of heat-sterilized catgut can be extended somewhat to the right, as indicated by the area legended "Heat-Chromic," so that the absorption characteristics of chromic guts can be carried through the remainder of the fast absorption zone and into the faster portion of the moderate absorption zone.

The fact that 90% of present-day suture sales are of chromic gut evidences the desire of the surgeon for slower absorption rates. Nevertheless, by no known practical process which is followed by heat-sterilization, can, as the diagram shows, the absorption characteristics be carried into either the slower portion of the moderate zone, the slow or the very slow zones.

In comparison with the limited area of heat-sterilized plain and chromic catgut absorption characteristics, the very wide range of absorption characteristics attained in accordance with this invention by the use of ethylene oxide is also indicated in the diagram of Fig. 1. The absorption characteristics can be carried not only through the moderate zone, but also through the slow zone and almost entirely through even the very slow zone; and this can be done without resort to chromic treatment, the particular absorption rate desired being regulated wholly by the amount of ethylene oxide provided for reaction with the gut.

Sterility requirements

Figure 2:
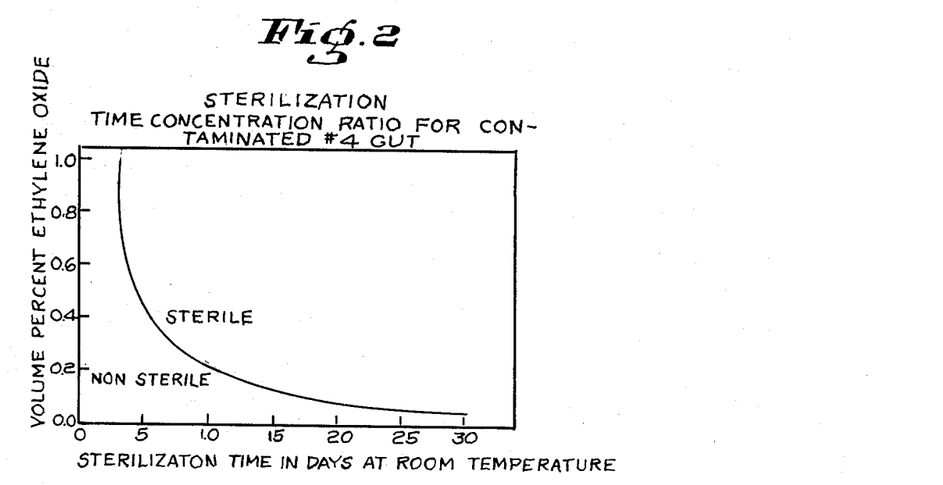
Figure 2 is a chart showing the time concentration ratio for contaminated No. 4 gut with the concentration expressed as the percent ethylene oxide by liquid volume.

The concentration of ethylene oxide necessary to achieve sterilization depends upon the size of the gut, total volume of the fluid, the number and kinds of organisms, the storage time, the storage temperature, etc. Fig. 2 reproduces the results of a very severe test designed to set the minimum ethylene oxide concentration necessary to accomplish sterilization. The test was made on the largest commonly used size gut, i. e. No. 4 gut. This large size gut was heavily contaminated with very resistant spore forms of *Bacillus globigii*. It was found by sealing the contaminated gut in a tube containing 1% by volume of ethylene oxide in 3½ cc. of 95% ethanol tubing fluid, that sterility was achieved in three days. With reduction in ethylene oxide concentration, the period of time necessary to achieve sterilization gradually increased in accordance with the curve shown in Fig. 2, such that after the ethylene oxide concentration was reduced to .1% by volume, eighteen days were required to achieve sterility and that, when concentration was reduced to .05% ethylene oxide, approximately thirty days were necessary to achieve sterility. This concentration of .05% ethylene oxide is therefore considered to be the safe minimum standard for sterilization of all gauges and lengths of sutures utilized generally today, but, for smaller sizes, or storage periods exceeding 30 days, the concentration may be as low as .01%. As a practical matter, sterilization in four days is highly desirable since it is necessary that sutures be completely sterile before they are marketed. Four-day sterility may be achieved in accordance with the following table, 60-inch lengths of gut being utilized in 3½ cc. of 95% ethanol tubing fluid:

TABLE I

| Catgut Size | Concentration of Ethylene Oxide in Fluid by Volume, Percent | Period Before Sterility, Days |
|---|---|---|
| #3 | 0.5 | 4 |
| #2 | 0.5 | 4 |
| #1 | 0.5 | 4 |
| #0 | 0.5 | 4 |
| #00 | 0.2 | 4 |
| #000 | 0.2 | 4 |
| #0000 | 0.2 | 4 |
| #00000 | 0.1 | 4 |
| #000000 | 0.1 | 4 |

With catgut of all sizes, of course, the concentration of ethylene oxide may be decreased to give sterility at much greater periods than four days. Also, the period before sterilization with any concentrations may be shortened by storage at temperatures greater than room temperature but not above 70° C. It is considered, however, that the .05% concentration discussed above is a practical minimum for positive sterility for all sizes below which the ethylene oxide concentration should not be reduced, and .01% is a permissible minimum for #00000 with a long storage period.

*Inclusion of softening agent*

In the examples of this invention, I prefer that the suture material be plasticized with water because that plasticizer is inexpensive, easy to use and efficient. A minimum amount of water appears to be necessary in order to accomplish sterilization by means of ethylene oxide. The only exception to this appears to be the fact that methyl alcohol may be substituted for water with comparable results. Where other fluids are used as tubing fluids, the minimum amount of water recommended for each 100 milligrams of suture varies with the tubing fluid used in accordance with the following table:

TABLE II

| Fluid | Mgms. Water/100 Mgs. Gut |
|---|---|
| Methanol | 0 |
| Ethanol | 2.5 |
| 2-propanol | 50 |
| 1-butanol | 50 |
| 2-methyl 1-propanol | 50 |
| 2 methyl 2-propanol | 50 |
| Xylene | 12.5 |

In any event, with only the minimum amount of water necessary to achieve sterility with ethylene oxide in any fluid, a very non-pliable suture results. Usually, therefore, additional water to obtain optimum plasticity, e. g. to the extent of about 5% with ethyl alcohol and 10-15% with other alcohols, should be present.

*Effect on absorption rates of ethylene oxide concentration*

The limitation of the concentration of ethylene oxide to only that small volume which is necessary to insure safe sterilization will result in the production of sterile catgut sutures which have very slow rates of absorption in animal tissue, substantially as slow as the absorption rate of raw catgut. The effect on absorption rate of addition of further quantities of ethylene oxide up to the maximum 2% volume concentration limit of this invention will now be discussed.

First, it is necessary to set forth an acceptable method for determining absorption rates:

In the past, it has been common practice to measure the absorbability of catgut sutures either by measuring the rate of digestion of implanted sutures in experimental animals or the in-vitro rate of digestion in enzyme solutions. Both techniques provide valuable data, but both also have serious drawbacks. Animal work is technically difficult, takes long periods of time, and, in general, is subject to considerable error. Enzyme techniques, on the other hand, although simpler and less time consuming than animal studies, utilize preparations which are relatively impure and require careful standardization and control.

For these reasons, I prefer a technique not so well known as the other two, but one which permits a much more precise measurement of absorption characteristics. This method, which is known as the shrinkage temperature method, has been described in detail in Surgery, Gynecology and Obstetrics, October 1946, volume 83, pages 521-527. Its use in evaluating absorption is predicated upon the fact that it provides a precise measurement of the physical and chemical conditions of the collagen suture which are intimately involved in tissue digestion. The method depends for its utility upon the physical circumstance that catguts of similar origin and which have been subjected to similar treatment have a definite sharp temperature point at which shrinkage occurs when they are immersed under slight tension in a gradually heated, buffered aqueous solution. Sutures of the same size which have relatively high shrinkage temperatures have relatively slow rates of absorption whereas sutures of the same size having relatively low shrinkage temperatures are relatively very quickly digestible provided the treatment is of the same kind varying only as to intensity and duration.

The shrinkage temperature of raw gut is approximately 62° C. This raw gut shrinkage temperature varies somewhat depending upon the technique used in its measurement, upon the condition of the animal from which the catgut was obtained, and upon the initial processing from intestine to raw gut. At any rate, raw gut is relatively resistant to digestion.

When, however, raw gut is subjected to heat-sterilization (150°-160° C.), it is found that its shrinkage temperature has dropped by approximately 19° C. Moreover, even though catgut is subjected to commercial chromic treatment, whereby its unsterilized shrinkage temperature rises to approximately 80-81° C., as distinguished from the 62° C. of plain gut, the chromic gut, upon heat-sterilization at 150°-160° C., will also exhibit a loss in shrinkage temperature of about 19° C. I designate such a loss in shrinkage temperature, due to treatment, as the temperature-absorbency decrement, sometimes referred to hereinafter as Δ. Temperature-absorbency decrements of the magnitude of about 19° C. for heat-sterilized gut indicate a substantial increase in rate of absorption of sterile gut in animal tissue over unsterilized gut. In any process involving heat-sterilization, the decrement is always of this order of magnitude. While excessive tanning might tend to limit the decrement to a slightly lesser value, the inclusion of any metal such as chromium into sutures in high proportions grossly alters the chemical nature of the collagen and hence is undesirable.

In accordance with my invention, which omits heat-sterilization and relies instead on chemical sterilization by ethylene oxide, I can produce sterile sutures which have temperature absorbency decrements ranging from practically 0° C. all the way up to a value corresponding to that which is a maximum desirable rate of absorption in living tissue merely by regulating the amount of ethylene oxide added to the package.

Figure 3:
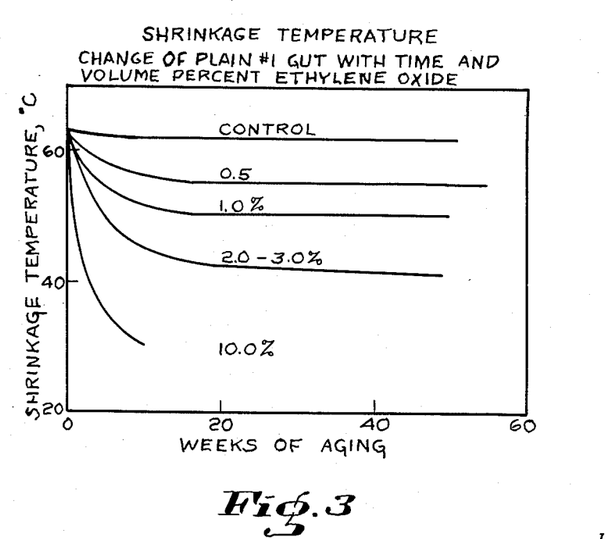
Figure 3 is a chart showing shrinkage temperature of plain No. 1 gut with time and volume percent of ethylene oxide.
Figure 4:
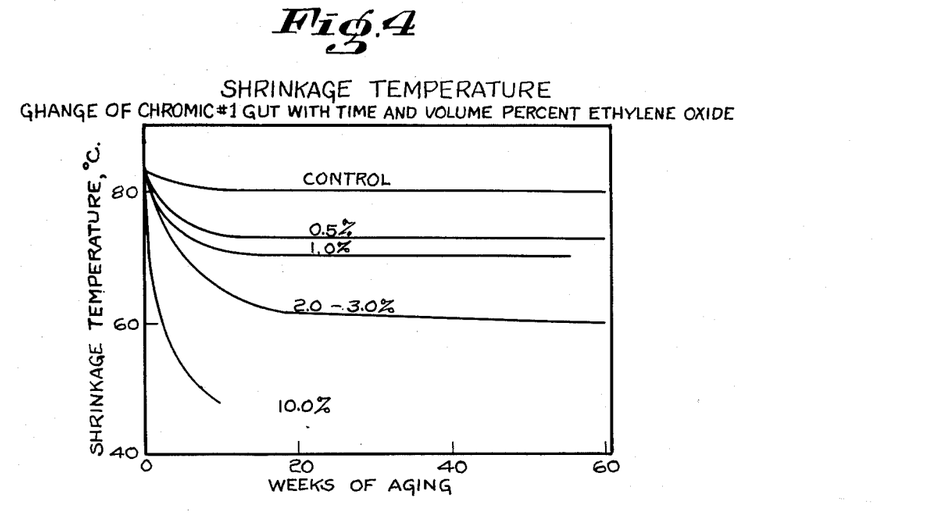
Figure 4 is a chart showing the shrinkage temperature of chromic No. 1 gut in relation to time and volume percent of ethylene oxide.

In Fig. 3, I have indicated the results of experiments with #1 plain catgut in sealed tubes with 3.5 cc. of tubing fluid showing the magnitude of loss in shrinkage temperature with time and increasing amounts of ethylene oxide. In Fig. 4, I have shown similar results in the case of chromic No. 1 catgut sutures. As shown in both Figs. 3 and 4, after substantial equilibrium has been reached (20 weeks' storage), the temperature-absorbency decrement for a No. 1 suture, both chromic and plain, is between 10° and 12° C., with 1% ethylene oxide volume concentration.

Figure 5:
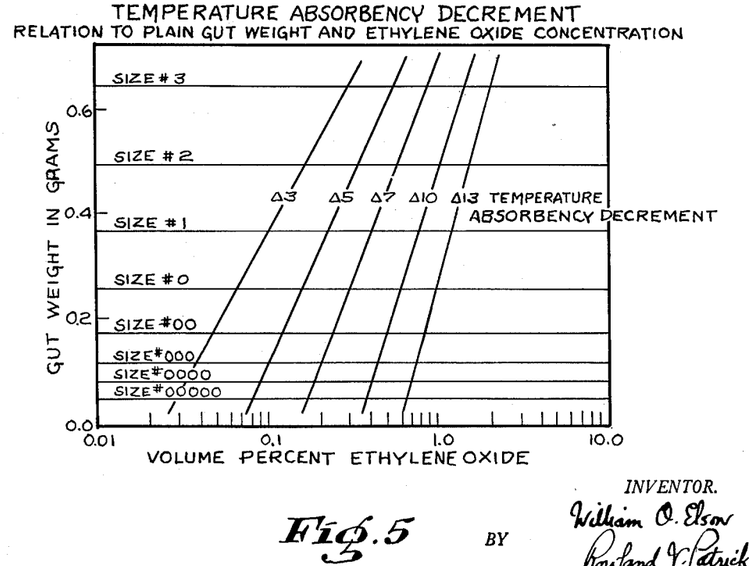
Figure 5 is a chart showing the temperature absorbency decrement of plain gut in relation to the weight of the gut and the volume percent of ethylene oxide.
Figure 6:
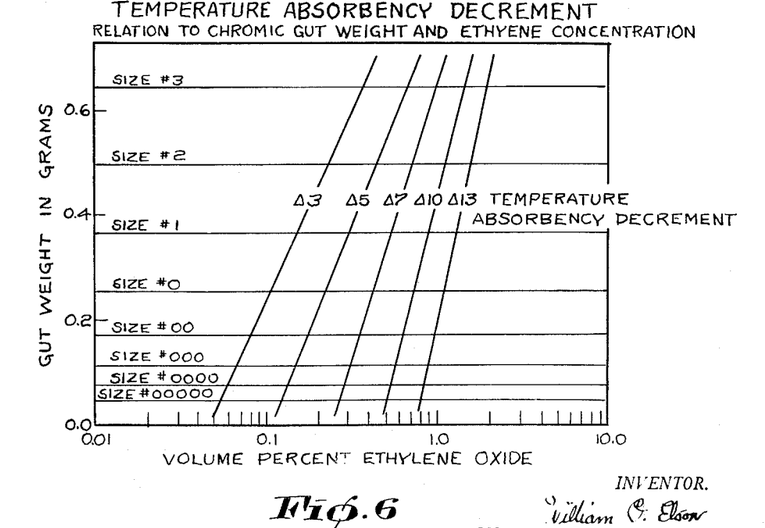
Figure 6 is a chart showing the temperature absorbency decrement of chromic gut in relation to the weight of the gut and the volume percent of ethylene oxide.

Similar data has been assembled with respect to all other normal sizes of plain and chromic catgut, the results of which are reflected in Figs. 5 and 6.

In Fig. 5 there is shown a series of curves which show the amount of ethylene oxide in 3.5 cc. of tubing fluid causing different temperature-absorbency decrements for each of the most popular sizes of U. S. P. gauge plain catguts now in use, the ethylene oxide concentration being plotted logarithmically.

Fig. 6 shows a similar relationship in the case of chromic gut.

In the case of both plain and chromic guts, I have determined that a temperature-absorbency decrement of about 13° C. is the maximum permissible decrement without increasing the rate of absorption beyond that which is commercially practical and acceptable to the surgeon. Thus, in both of the graphs shown in Figs. 5 and 6, any hermetically sealed package containing a weight of gut and a concentration of ethylene oxide such that is represented by any point to the left of the curves $\Delta 13$ will provide, after storage, a sterile catgut suture having satisfactory absorption characteristics; whereas those packages represented by points to the right of the curves $\Delta 13$ will provide sutures having impracticable fast absorption characteristics.

A table illustrating these principles in which average values of shrinkage temperature and $\Delta$ usually observed are presented, follows:

TABLE III

| Sterilization Treatment | Plain Gut | | Chromic Gut | |
|---|---|---|---|---|
| | Shrinkage Temperature, °C. | $\Delta$ | Shrinkage Temperature, °C. | $\Delta$ |
| Untreated | 62 | | 80 | |
| Heat-sterilized | 43 | 19 | 61 | 19 |
| Ethylene Oxide-sterilized | 62–49 | 0–13 | 80–67 | 0–13 |

Figure 7:
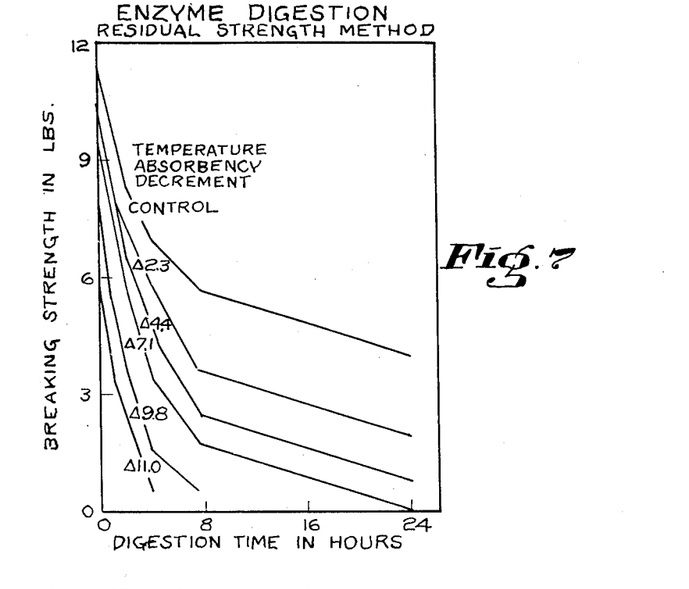
Figure 7 is a chart showing the loss in breaking strength in pounds with increasing time of enzyme digestion.
Figure 8:
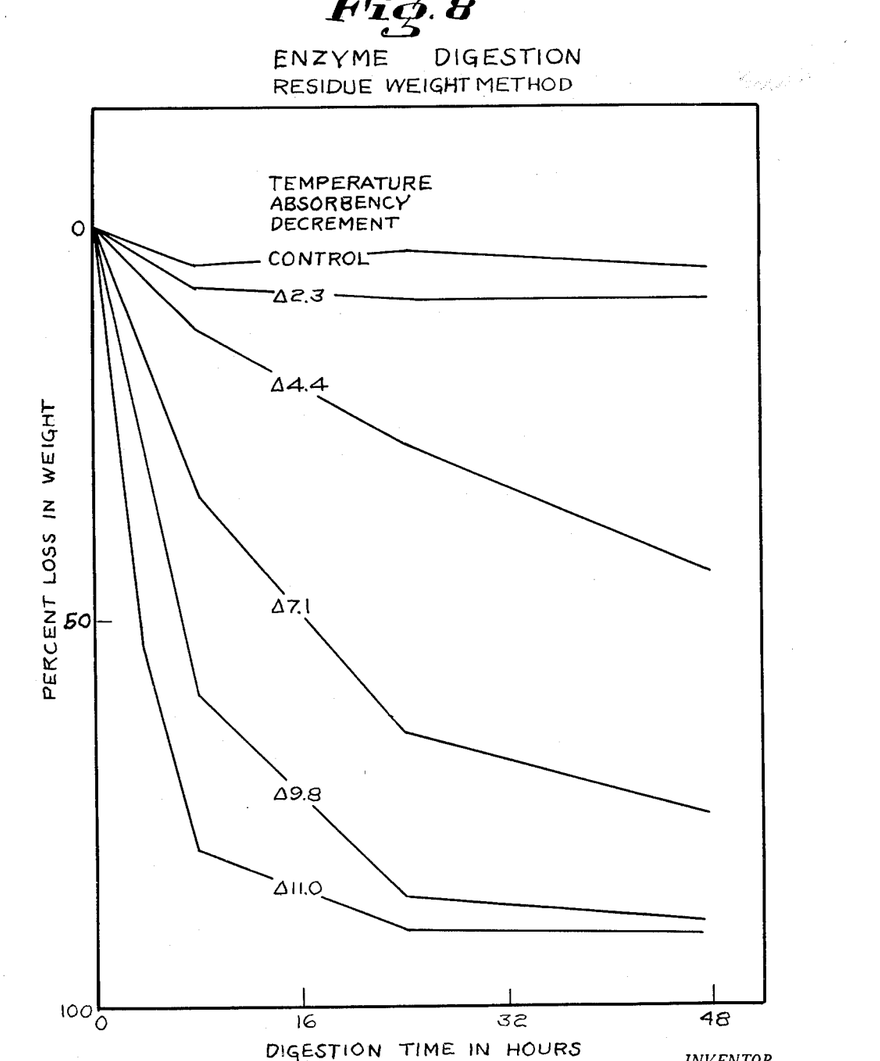
Figure 8 is a chart showing the percent loss in weight with increasing time of enzyme digestion.

The effectiveness of temperature-absorbency decrement values as an accurate indication of absorption rate by enzyme digestion is shown in the graphs of Figs. 7 and 8.

Fig. 7 shows the loss in breaking strength in pounds with increasing time of enzyme digestion, each curve representing a No. 1 plain catgut of different temperature-absorbency decrement caused by reaction with varying amounts of ethylene oxide. As there shown, as the temperature-absorbency decrement increases from a value of 0, which represents the control, to a value of 11, the rate of enzyme digestion as represented by the decrease in breaking strength, also increases. This is also shown, as illustrated in Fig. 8, wherein the increase in digestion rate, represented by a percent loss in weight of the suture, varies with the increase of temperature-absorption decrement.

The other experimental method of determining digestion, that is, by means of animal digestion studies involving implantation of catgut in animal tissue, also may be utilized to illustrate the relation of increased temperature-absorption decrement to increased absorption rate in the animal. Table IV indicates the correlation between temperature-absorption decrements from 2 to 15° C. and animal absorption as measured by loss of suture strength after 14 days' animal implantation.

TABLE IV

| Temperature Absorbency Decrement #1 Plain Gut | Percent of Original Strength After 14 Days' Animal Implantation |
|---|---|
| $\Delta 2$ | 50 |
| $\Delta 6$–8 | 30 |
| $\Delta 11$–13 | 15 |
| $\Delta 15$ | 0–2 |

Turning again to Fig. 1, the approximate positions of the $\Delta$ values for plain ethylene oxide reacted gut are indicated. Any plain ethylene oxide reacted gut which has a $\Delta$ value of approximately 9 or less provides a sterile gut which has a rate of absorption lower than any presently available to the surgeon. Furthermore, if the $\Delta$ value is kept below approximately 13 by proper proportioning of the ethylene oxide, one may provide untanned sterile catguts having, for the first time, absorption rates slower than the slowest absorption rate of present-day heat-sterilized plain catgut. If slow absorption rate is not essential, one may, in accordance with my invention, by the inclusion of greater amounts of ethylene oxide still within the 2% maximum limit, produce plain ethylene oxide reacted guts which approximate and even exceed absorption rates of present-day plain heat-sterilized catgut but whose processing and preparation is much more economical.

From my experiments with the sterilization of catgut by means of ethylene oxide in closed tubes, I have evolved formulae which give the approximate relationship after 6 months' aging, between the weight of the suture, the percentage of ethylene oxide employed and the temperature-absorbency decrement. In the formulae, W represents the weight of a 60-inch length of catgut in milligrams, C represents the concentration by volume (i. e. 2% is represented by 2.) of ethylene oxide in 3½ cc. of tubing fluid and $\Delta$ represents the temperature-absorbency decrement brought about by the use of varying percentages of ethylene oxide with various weights of sutures. By the use of these formulae and by choosing values for two of the unknowns it is possible to determine the third unknown. Concentrations at other volumes may be obtained by the well-known equality $CV = C_1 V_1$ where C represents the concentration of liquid ethylene oxide at any one volume V; and $C_1$ represents a different concentration at a different volume $V_1$.

For plain gut:

$$W = (59.9\Delta + 425) \log C - 69.4\Delta + 1183$$

$$\text{Log } C = \frac{W + 69.4\Delta - 1183}{59.9\Delta + 425}$$

$$\Delta = \frac{W - 425 \log C - 1183}{59.9 \log C - 69.4}$$

For chromic gut:

$$W = (77.5\Delta + 447) \log C - 74.3\Delta + 1158$$

$$\text{Log } C = \frac{W + 74.3\Delta - 1158}{77.5\Delta + 447}$$

$$\Delta = \frac{W - 447 \log C - 1158}{77.5 \log C - 74.3}$$

Since the maximum $\Delta$ value is fixed at approximately 13° C., by the practically usable limit for absorbability the only other limitation appears to be the lower limit for general sterilization of .05% of ethylene oxide (.01% of ethylene oxide for very small guts) for a thirty day sterilization period. Practically speaking, of course, there is a limit on the size of sutures. Catguts larger than size #4 are rarely used because smaller sutures give all the strength required, are much easier to use and do much less damage to the tissue being sutured.

Satisfactory examples of pliable U. S. P. sutures with acceptable absorption rates in accordance with this invention, tubed in 95% ethanol with various amounts of ethylene oxide are contained in the following table:

TABLE V

| Example | Catgut Size | Tubing Fluid—3.5 cc. | Approximate Δ value |
|---|---|---|---|
| 1 | #4 plain | 1.1% ethylene oxide / 98.9% ethanol (95%) | Δ7 |
| 2 | #3 plain | 0.8% ethylene oxide / 99.2% ethanol (95%) | Δ7 |
| 3 | #2 plain | 0.6% ethylene oxide / 99.4% ethanol (95%) | Δ7 |
| 4 | #1 plain | 0.4% ethylene oxide / 99.6% ethanol (95%) | Δ7 |
| 5 | #0 plain | 0.3% ethylene oxide / 99.7% ethanol (95%) | Δ7 |
| 6 | #00 plain | 0.2% ethylene oxide / 99.8% ethanol (95%) | Δ7 |
| 7 | #000 plain | 0.2% ethylene oxide / 99.8% ethanol (95%) | Δ7 |
| 8 | #0000 plain | 0.1% ethylene oxide / 99.9% ethanol (95%) | Δ7 |
| 9 | #00000 plain | 0.1% ethylene oxide / 99.9% ethanol (95%) | Δ7 |
| 10 | #000000 plain | 0.06% ethylene oxide / 99.94% ethanol (95%) | Δ7 |
| 11 | #4 chromic | 1.1% ethylene oxide / 98.9% ethanol (95%) | Δ7 |
| 12 | #3 chromic | 1.0% ethylene oxide / 99.0% ethanol (95%) | Δ7 |
| 13 | #2 chromic | 0.7% ethylene oxide / 99.3% ethanol (95%) | Δ7 |
| 14 | #1 chromic | 0.5% ethylene oxide / 99.5% ethanol (95%) | Δ7 |
| 15 | #0 chromic | 0.4% ethylene oxide / 99.6% ethanol (95%) | Δ7 |
| 16 | #00 chromic | 0.3% ethylene oxide / 99.7% ethanol (95%) | Δ7 |
| 17 | #000 chromic | 0.3% ethylene oxide / 99.7% ethanol (95%) | Δ7 |
| 18 | #0000 chromic | 0.2% ethylene oxide / 99.8% ethanol (95%) | Δ7 |
| 19 | #00000 chromic | 0.2% ethylene oxide / 99.8% ethanol (95%) | Δ7 |
| 20 | #1 plain | 0.1% ethylene oxide / 99.9% ethanol (95%) | Δ3 |
| 21 | do | 0.2% ethylene oxide / 99.8% ethanol (95%) | Δ5 |
| 22 | do | 0.7% ethylene oxide / 99.3% ethanol (95%) | Δ10 |
| 23 | do | 1.2% ethylene oxide / 98.8% ethanol (95%) | Δ13 |
| 24 | #1 chromic | 0.15% ethylene oxide / 99.85% ethanol (95%) | Δ3 |
| 25 | do | 0.3% ethylene oxide / 99.7% ethanol (95%) | Δ5 |
| 26 | do | 0.8% ethylene oxide / 99.2% ethanol (95%) | Δ10 |
| 27 | do | 1.3% ethylene oxide / 98.7% ethanol (95%) | Δ13 |

Satisfactory examples of U. S. P. sutures with acceptable absorption rates less than Δ13 in accordance this invention and tubed in various fluids are contained in the following table, Examples 29, 35, 38 and 39 having less than optimum pliability:

TABLE VI

| Example | Catgut Size | Tubing Fluid—3.5 cc. |
|---|---|---|
| 28 | #1 plain | 0.5% ethylene oxide / 99.5% methanol. |
| 29 | #4 plain | 1.0% ethylene oxide / 1.0% methanol / 98.0% isopropanol. |
| 30 | #3 chromic | 1.0% ethylene oxide / 9.0% methanol / 90.0% xylene. |
| 31 | #1 chromic | 0.5% ethylene oxide / 9.5% methanol / 90.0% xylene. |
| 32 | #0 plain | 0.1% ethylene oxide / 9.9% methanol / 90.0% n-butanol. |
| 33 | #4 chromic | 2.0% ethylene oxide / 98.0% ethanol (95%). |
| 34 | #000000 plain | 0.02% ethylene oxide / 99.98% ethanol (95%). |
| 35 | #1 plain | 0.5% ethylene oxide / 3.0% methanol / 96.5% xylene. |
| 36 | do | 0.5% ethylene oxide / 9.5% water / 90.0% isopropanol. |
| 37 | do | 0.5% ethylene oxide / 9.5% water / 90.0% acetone. |
| 38 | do | 0.5% ethylene oxide / 4.0% water / 95.5% diethyl carbonate. |
| 39 | #0 plain | 0.5% ethylene oxide / 5.0% water / 94.5% 1-methoxy-2 propanol. |
| 40 | #0000 chromic | 0.1% ethylene oxide / 99.9% methanol. |

Examples of sutures having unacceptably fast absorbency rates are as follows:

TABLE VII

| Example | Catgut Size | Tubing Fluid—3.5 cc. | Approximate Δ Value |
|---|---|---|---|
| 41 | #0000 plain | 1.0% ethylene oxide / 99.0% ethanol (95%) | Approximately 16. |
| 42 | #0 plain | 2.0% ethylene oxide / 98.0% ethanol (95%) | Approximately 20. |
| 43 | #1 chromic | 5.0% ethylene oxide / 95.0% ethanol (95%) | Greater than 30. |
| 44 | #00 plain | 1.5% ethylene oxide / 98.5% ethanol (95%) | Approximately 18. |
| 45 | #1 plain | 2.5% ethylene oxide / 97.5% ethanol (95%) | Approximately 20. |

When heat below sterilization heat (150–160° C.) but above 70° C. is applied to catgut sutures prior to packaging with ethylene oxide, a shrinkage temperature drop additional to that caused by the ethylene oxide concentration takes place. However, for each degree of shrinkage temperature drop caused by sub-sterilization heat the effect upon absorption rate does not appear to be as great as that caused by ethylene oxide treatment. Hence, sutures having absorption rates within the acceptable limit for surgical use of this invention can be prepared by a combination of low heat treatment and ethylene oxide treatment. Where this is the case the summation of the Δ values caused by each, may yield a total Δ value of slightly more than 13. In a case of combination of preheat treatment and ethylene oxide treatment, the maximum allowable Δ value can therefor be 3–4 more than 13 (i. e. up to about 17) and practical absorption rates will still be maintained.

In preparing the sutures, the ethylene oxide is preferably introduced into the tube in a liquid condition before sealing. In order to do this, the ethylene oxide which is normally a gas, is chilled below 10° C. and preferably to 4° C. Such liquid ethylene oxide may thereafter be added in the proper proportion to the tubing fluid, which need not be chilled, in any quantity. The aliquots for each package may then be measured off from the prepared mixture.

Throughout the description hereinbefore given, and in all the tests hereinabove referred to, the amount of tubing fluid present in the package was approximately 3½ cc., because that is the volume of tubing fluid generally observed in present day commercial suture put-ups, which are hermetically sealed packages and comprise flame-sealed glass ampoules, heretofore referred to as tubes.

Changes in volume of the tubing fluid in any single package may require slight changes in ethylene oxide concentration based upon the total volume of the tubing fluid, in order to achieve equivalent results, particularly with respect to absorbability. The change in concentration should be downward with increasing volumes and, hence, in each case the amount by volume will always still fall within the range of about .01 to something less than 2%. In other words, increases in total volume of tubing fluid require reduction in the amount of ethylene oxide by volume in the tubing fluid in order to produce equivalent Δ value. Decreasing the total volume may require slight increase in concentration but never above about 2% by volume.

I claim:

1. A catgut suture conforming to minimum U. S. P. tensile strength suture requirements, said suture comprising a sterile reaction product of a strand of catgut with a solution containing ethylene oxide, the ethylene oxide being .01 to 2% by liquid volume of the solution, said reacted catgut having a shrinkage temperature not more than 9° C. below that of the unreacted catgut.

2. A catgut suture conforming to minimum U. S. P. tensile strength suture requirements, said suture comprising a sterile reaction product of a strand of catgut with a solution containing ethylene oxide, the ethylene oxide being .01 to 2% by liquid volume of the solution, said reacted catgut having a shrinkage temperature of at least 49° C.

3. An interiorly sterile sealed container containing a tubing fluid and a flexible sterile catgut suture conforming to minimum U. S. P. tensile strength suture requirements, said suture comprising a sterile reaction product of a strand of catgut with a solution containing ethylene oxide, the ethylene oxide being .01 to 2% by liquid volume of the solution, said reacted catgut having a shrinkage temperature of at least 49° C.

4. An interiorly sterile sealed container containing a tubing fluid and a flexible sterile catgut suture conforming to minimum U. S. P. tensile strength suture requirements, said suture comprising a sterile reaction product of a strand of catgut with a solution containing ethylene oxide, the ethylene oxide being .01 to 2% by liquid volume of the solution, said reacted catgut having a shrinkage temperature not more than 13° C. below that of the unreacted catgut.

5. A container in accordance with claim 4 wherein the tubing fluid comprises ethyl alcohol and water.

6. A container in accordance with claim 4 wherein the catgut is a 60-inch length of No. 0 catgut suture, the ethylene oxide in the solution is in the range of about .2% and the reacted catgut has a shrinkage temperature of about 5-7° C. below that of the unreacted cutgut.

7. A container in accordance with claim 4 wherein the catgut, prior to reaction, is plain cutgut, and the initial percent concentration by liquid volume of the ethylene oxide, the initial weight of the suture, and the temperature absorbency decrement after substantial equilibrium bearing a relationship on the basis of 3½ cc. of liquid solution as expressed substantially by the formula:

$$\text{Log } C = \frac{W + 69.4\Delta - 1183}{59.9\Delta + 425}$$

where $\Delta$ is a temperature absorbency decrement less than 13, W is the weight of the catgut in milligrams and C is the percent concentration by liquid volume of the ethylene oxide.

8. A container in accordance with claim 4 wherein the catgut, prior to reaction, has been chromicized, and the initial percent concentration by liquid volume of the ethylene oxide, the initial weight of the suture, and the temperature absorbency decrement after substantial equilibrium bearing a relationship on the basis of 3½ cc. of liquid solution as expressed substantially by the formula:

$$\text{Log } C = \frac{W + 74.3\Delta - 1158}{77.5\Delta + 447}$$

where $\Delta$ is a temperature absorbency decrement less than 13, W is the weight of the catgut in milligrams and C is the percent concentration by liquid volume of the ethylene oxide.

9. The method of treating a catgut suture to sterilize the suture and impart to the same a predetermined rate of absorption in living animal tissue, comprising storing a catgut suture with a tubing fluid, hermetically sealed in a container, said tubing fluid comprising a liquid vehicle, ethylene oxide and a softening agent for catgut, said softening agent being selected from the group consisting of water and methyl alcohol, the amount of tubing fluid present containing softening agent in an amount sufficient to render said catgut flexible while maintaining minimum U. S. P. tensile strength suture requirements, said ethylene oxide being present in a concentration by liquid volume of the tubing fluid of between .01 and 2%, and sufficient to sterilize said suture during said storage while maintaining U. S. P. tensile strength suture requirements, and the exact concentration of ethylene oxide within said .01 to 2% range being selected with relation to the weight of the catgut such that the predetermined rate of its absorption in living tissue is obtained while maintaining its shrinkage temperature during said storage within 13° C. of its shrinkage temperature prior to storage in said container.

10. The method as claimed in claim 9 wherein the shrinkage temperature of the catgut is maintained within 9° C. of its shrinkage temperature prior to storage.

11. The method of claim 9 wherein the suture is a 60-inch length of No. 0 catgut suture and the ethylene oxide concentration is about .2% by volume of the tubing fluid and wherein the shrinkage temperature is maintained within 5-7° C. less than its shrinkage temperature prior to storage.

References Cited in the file of this patent

UNITED STATES PATENTS

| | | |
|---|---|---|
| 1,596,785 | Weyland | Aug. 17, 1926 |
| 1,970,578 | Schoeller | Aug. 21, 1934 |
| 2,075,845 | Gross | Apr. 6, 1937 |
| 2,189,947 | Griffith | Feb. 13, 1940 |
| 2,215,453 | Buchgraber | Sept. 24, 1940 |

OTHER REFERENCES

American Journal of Hygiene, vol. 50, pages 270–279, 1949.